United States Patent
Reitzel

(10) Patent No.: US 9,190,193 B1
(45) Date of Patent: Nov. 17, 2015

(54) DISPOSABLE BATTERY SAFETY COVER

(71) Applicant: Emery David Reitzel, Westland, MI (US)

(72) Inventor: Emery David Reitzel, Westland, MI (US)

( * ) Notice: Subject to any disclaimer, the term of this patent is extended or adjusted under 35 U.S.C. 154(b) by 0 days.

(21) Appl. No.: 14/299,783

(22) Filed: Jun. 9, 2014

(51) Int. Cl.
- *H01R 4/70* (2006.01)
- *H01B 17/38* (2006.01)
- *H01M 2/34* (2006.01)

(52) U.S. Cl.
CPC .............. *H01B 17/38* (2013.01); *H01M 2/344* (2013.01); *H01M 2/34* (2013.01)

(58) Field of Classification Search
CPC ......... H02G 3/081; H02G 3/14; H01M 2/344; H01M 2/342; H01M 6/46; H01M 2/20; H01M 2/32; H01M 2/34; H05K 5/03; H01B 17/38; H01R 4/70
USPC ........ 174/138 F, 66, 67, 50, 135, 137, 138 G, 174/137 R; 220/241, 242; 429/1, 163, 65, 429/100, 121; 439/759, 536, 754
See application file for complete search history.

(56) References Cited

U.S. PATENT DOCUMENTS

| | | | | |
|---|---|---|---|---|
| 2,070,426 | A | * | 2/1937 | Faber ............................... 429/65 |
| 2,901,526 | A | * | 8/1959 | Alton et al. ................... 429/121 |
| 3,473,965 | A | * | 10/1969 | Barge .............................. 429/65 |
| 3,655,456 | A | * | 4/1972 | Hamel .......................... 429/163 |
| 3,884,725 | A | * | 5/1975 | Schmidt .......................... 429/65 |
| 3,910,800 | A | | 10/1975 | Groby et al. |
| 3,956,576 | A | * | 5/1976 | Jensen et al. ................ 174/138 F |
| 4,024,953 | A | * | 5/1977 | Nailor, III ..................... 439/759 |
| 4,608,528 | A | * | 8/1986 | Stillwell ........................... 429/1 |
| 5,132,175 | A | | 7/1992 | Mrotek et al. |
| 5,200,280 | A | | 4/1993 | Karasa |
| 5,283,137 | A | | 2/1994 | Ching |
| 5,348,815 | A | | 9/1994 | Barker |
| 5,403,677 | A | * | 4/1995 | Lundie et al. ................... 429/65 |
| 5,965,292 | A | | 10/1999 | Kim et al. |
| 6,117,575 | A | * | 9/2000 | Dinsdale .......................... 429/1 |
| 6,166,519 | A | * | 12/2000 | Gault ............................ 429/100 |
| 6,291,970 | B1 | * | 9/2001 | Miller et al. ...................... 429/1 |
| 6,746,795 | B2 | | 6/2004 | Schwarz |
| 2013/0183557 | A1 | | 7/2013 | Schwarz |
| 2014/0023911 | A1 | | 1/2014 | Gibellini |

FOREIGN PATENT DOCUMENTS

| | | |
|---|---|---|
| CA | 2419393 | 8/2004 |
| CN | 2809888 | 8/2006 |
| CN | 202712280 | 1/2013 |
| EP | 1179867 | 2/2002 |

* cited by examiner

*Primary Examiner* — Angel R Estrada
(74) *Attorney, Agent, or Firm* — Vincent Re PLLC

(57) ABSTRACT

A nine volt battery includes terminals exposed on a top surface of the battery and can easily accidentally come into contact with a conductive material. A device is provided for preventing creation of a low resistance circuit by a nine volt battery includes a safety cover configured to securely adhere to at least one of two terminals of the battery, thereby preventing creation of a circuit through the battery.

14 Claims, 6 Drawing Sheets

DISPOSABLE BATTERY SAFETY COVER

TECHNICAL FIELD

This disclosure is related to an object for use in covering battery terminals. In particular, the disclosure is related to a disposable safety cover used to stop nine volt batteries from coming into contact with a conductive material and creating a low resistance circuit.

BACKGROUND

The statements in this section merely provide background information related to the present disclosure. Accordingly, such statements are not intended to constitute an admission of prior art.

Batteries are known devices which provide portable direct current electrical power for battery powered devices. A nine volt battery is a widely known and widely used battery configuration wherein a positive terminal and a negative terminal are present upon a same top surface of the battery.

Electrical circuits are known in the art and require that electrical energy can flow in a complete circuit. A battery or a plurality of batteries can be used in a circuit, wherein a battery provides a voltage potential or voltage rise in the circuit. For a given voltage potential, a current in the circuit can be determined according to the relationship voltage potential equals current times electrical resistance. When resistance is relatively high in an electrical circuit, the current for the circuit is relatively low. When resistance is relatively low in an electrical circuit, the current for the circuit is relatively high. If resistance is very low in a circuit including a battery, the current can get very high. In such a low resistance circuit, the battery supplying the electrical energy to the circuit can heat up significantly to a point where a dangerous thermal event can in certain circumstances be created.

Nine volt batteries are designed to have very low resistance between the internal components of the battery and the battery terminals. If any conductive piece spans the two terminals of a nine volt battery, e.g. if a piece of aluminum foil is discarded in the same waste container as a partially depleted nine volt battery and touches both terminals, a very low resistance circuit can be created causing a thermal event in the battery.

Batteries contain chemicals that can be detrimental to the environment if the battery is simply thrown into a landfill. Recycling of batteries has become popular. While a partially depleted battery may include too little voltage potential to continue to be used by a consumer and may be ready to be recycled, the battery still can have enough charge to power an electrical circuit. Consumers wishing to recycle batteries will frequently store used batteries in groups, for example, in a bag or a box, until enough of them have been collected to warrant the effort to take the batteries to a recycling center. A group of nine volt batteries tossed into a bag or a box can accidentally create low resistance circuits.

SUMMARY

A nine volt battery includes terminals exposed on a top surface of the battery and can easily accidentally come into contact with a conductive material. A device is provided for preventing creation of a low resistance circuit by a nine volt battery includes a safety cover configured to securely adhere to at least one of two terminals of the battery, thereby preventing creation of a circuit through the battery.

BRIEF DESCRIPTION OF THE DRAWINGS

One or more embodiments will now be described, by way of example, with reference to the accompanying drawings, in which.

DETAILED DESCRIPTION

Low resistance circuits can be created by any conductive material spanning the terminals of a nine volt battery. In one example, a piece of metallic waste can come into contact with the terminals. In another example, a metallic casing on one nine volt battery can come into contact with terminals on another nine volt battery. In another example, two nine volt batteries can accidentally touch negative to positive terminal, negative to positive terminal.

A low resistance circuit including a nine volt battery and a piece of conductive material spanning the terminals of the battery can be avoided by preventing contact between at least one of the terminals and the conductive material. A device for preventing creation of a low resistance circuit including a nine volt battery is provided including a disposable safety cover preventing at least one of the terminals of the battery from contacting any conductive material.

Figure 1:
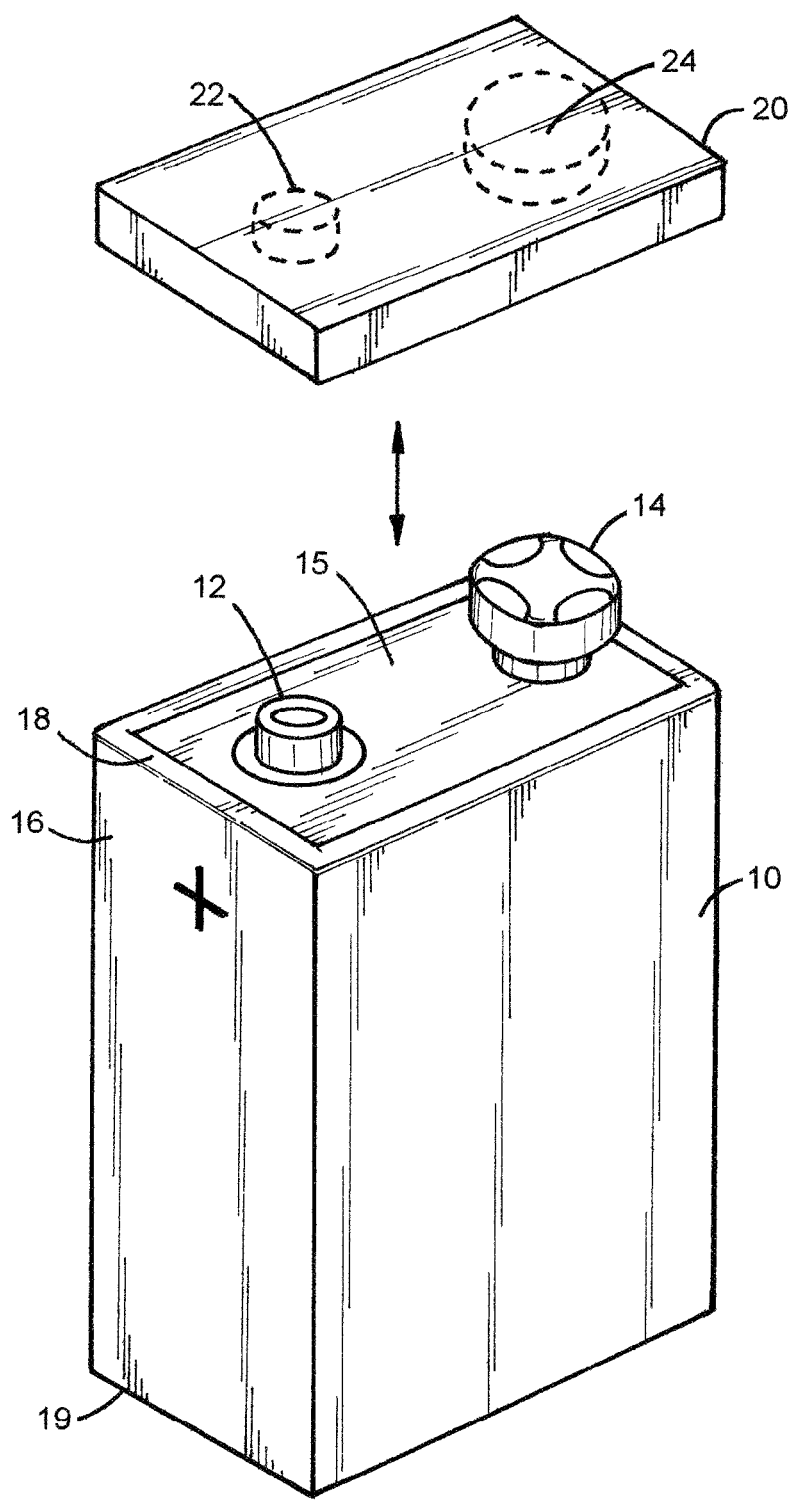
FIG. 1 illustrates an exemplary embodiment of a safety cover to be installed to a nine volt battery, in accordance with the present disclosure.

Referring now to the drawings, wherein the showings are for the purpose of illustrating certain exemplary embodiments only and not for the purpose of limiting the same, FIG. 1 illustrates an exemplary embodiment of a safety cover to be installed to a nine volt battery. Nine volt battery 10 is illustrated including positive terminal 12 and negative terminal 14, both located upon top surface 15 of the battery. Battery 10 further includes a metallic jacket 16 which includes wrapped edge 18 and wrapped edge 19. Safety cover 20 is illustrated including a battery connection hole 22 configured to receive terminal 12 and battery connection hole 24 configured to receive terminal 14. Safety cover 20 and the included battery connection holes can include a snap-on design, such that the cover includes a detent feature securingly attaches to the battery to prevent the cover from accidentally falling off. The holes, in one embodiment, can be tapered or constricted at the openings to create a more secure fit. Safety cover 20 can be sold as individual units or can be sold installed to fresh batteries, such that a user can install the old battery to the safety cover from the new battery as part of the replacement process.

Safety cover 20 can be made from any of a number of non-conducting materials including polymers, wood, recycled paper material. Battery terminals 12 and 14 are configured to snap to metallic connectors known in the art which normally are attached to electrical wires to create a circuit in a battery powered device. Safety cover can include metallic dummy connectors which do not connect to wires and do not create a circuit. In one embodiment, a production facility making battery terminals with electrical leads attached for battery powered devices could produce battery terminals without the electrical leads attached for use as disposable safety covers.

Figure 2:
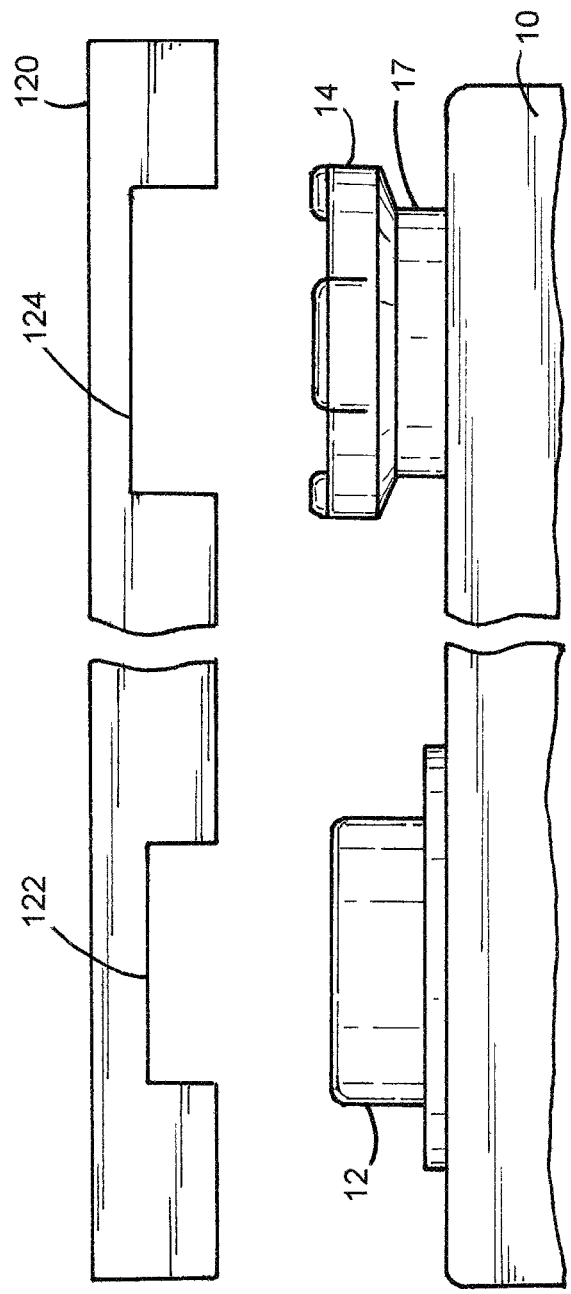
FIG. 2 illustrates a first embodiment of an exemplary safety cover in cross-section, in accordance with the present disclosure.

FIG. 2 illustrates a first embodiment of an exemplary safety cover in cross-section. An elastic or rubberized safety cover can be configured to receive a nine volt battery by stretching the elastic material and allowing the elastic material to apply a gripping force upon the battery terminals to remain attached to the battery. Battery 10 is illustrated including terminal 12 and terminal 14. Safety cover 120 is illustrated including battery connection hole 122 and battery connection hole 124. Safety cover 120 is constructed of a rubberized polymer that elastically stretches when a force is applied and recovers to its original shape when the force is removed. Battery connection hole 122 is too small to receive terminal 12, but as safety cover is stretched or pressed against battery 10, the rubberized polymer material deforms around terminal 12. Similarly, battery connection hole 124 is too small to receive terminal 14, but as safety cover is stretched or pressed against battery 10, the rubberized polymer material deforms around terminal 14. In one embodiment, the battery connection holes can include diameters between 1 mm to 4 mm smaller than the corresponding battery terminal, depending upon the particular rubberized material and the desired snap on and snap off force desired for the safety cover. Terminal 14, the negative terminal of the battery, includes undercut feature 17, and safety covers can include a feature or features to grip to the undercut feature 17.

If the safety cover is made of less elastic or more rigid materials, relatively small holes can be used to create battery connection holes, with an interference fit between the holes and the terminals creating the desired snap on fit of the safety cover to the battery. Such interference fits would depend upon the specific materials and can be designed according to methods known in the art. In one embodiment, the battery cover can be constructed of recycled paper material similar to a paper material egg carton known in the art. Such a recyclable material could include marketing advantages for consumers practicing environmentally sensitive recycling.

Figure 3:
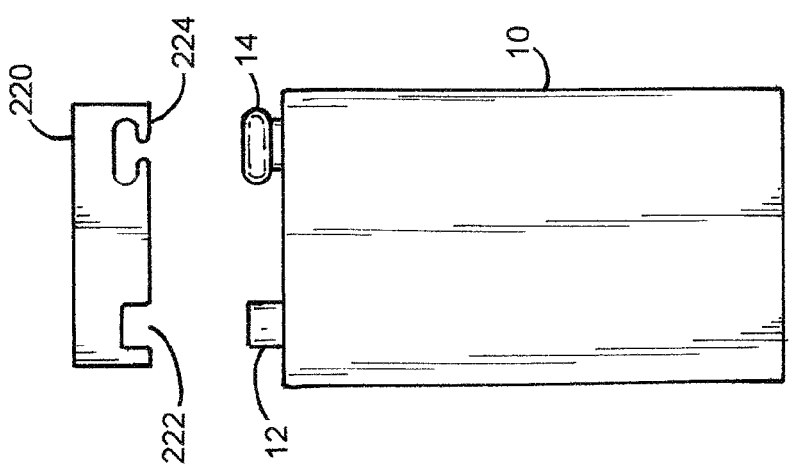
FIG. 3 illustrates a second embodiment of an exemplary safety cover in cross-section, in accordance with the present disclosure.

FIG. 3 illustrates a second embodiment of an exemplary safety cover in cross-section. Battery 10 is illustrated including terminal 12 and terminal 14. Safety cover 220 made of an elastic material is illustrated including battery connection hole 222 configured to receive terminal 12 and battery connection hole 224 configured to receive terminal 14. Battery connection hole 224 is shaped to positively grip around terminal 14. Further, battery connection hole 222 and battery connection hole 224 are positioned closer together than terminals 12 and 14. As a result, when safety cover 220 is installed to the terminals of battery 10, the stretch of the material between battery connection hole 222 and battery connection hole 224 causes safety cover 220 to be secured to the terminals.

Figure 4:
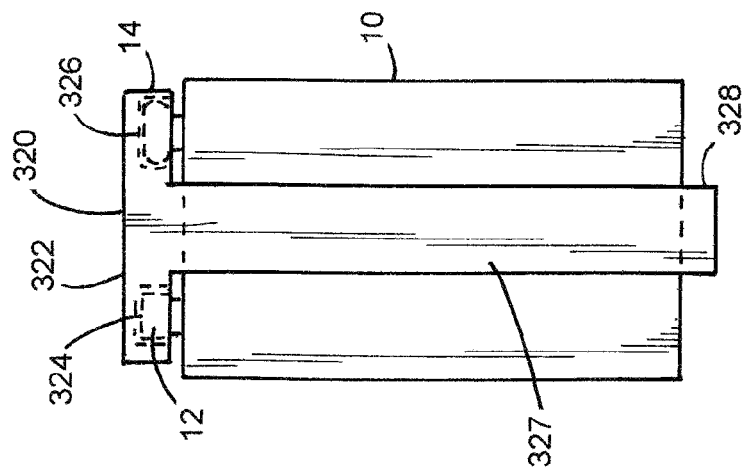
FIG. 4 illustrates a third embodiment of an exemplary safety cover, in accordance with the present disclosure.

FIG. 4 illustrates a third embodiment of an exemplary safety cover. Battery 10 is illustrated including terminal 12 and terminal 14. Safety cover 320 constructed of a hard plastic material is illustrated. Safety cover 320 includes upper tab 322 and lower tab 328 connected by vertical member 327. Upper tab 322 includes features to grip to terminals 12 and 14, for example, including terminal receiving holes 324 and 326 engaging to terminals 12 and 14. In another embodiment a slot running the length of tab 322 could engage both of the terminals. The features to grip the terminals should contain the terminals such that the terminals cannot slide out of the features without vertically displacing tab 322. Tab 328 grips to a bottom side of battery 10. In one embodiment, tab 328 can include a feature to either grip to the metal jacket around battery 10 or grip to a far side of the battery. By gripping a top and bottom of battery 10 including terminals 12 and 14, the plastic safety cover 320 can remain securely engaged thereto. Any of a wide variety of plastics including but not limited to polypropylene and acrylonitrile butadiene styrene (ABS) can be used to injection mold plastic cover 320.

Figure 5:
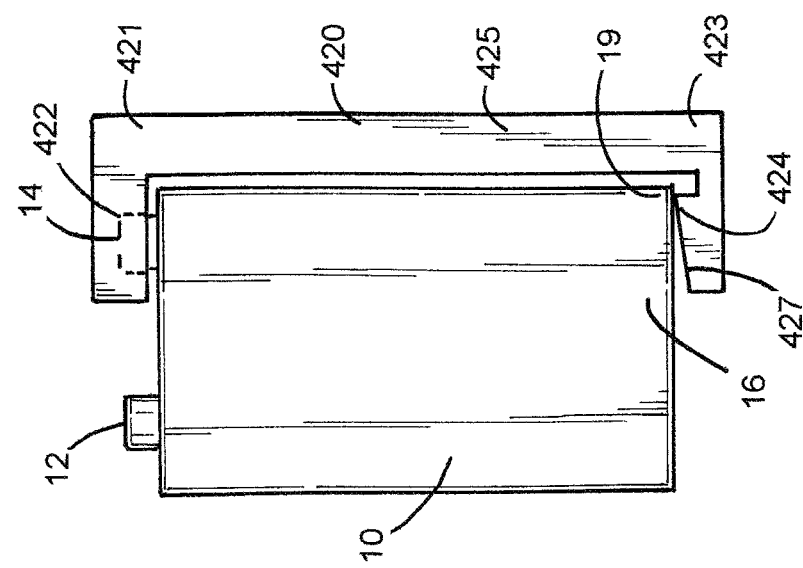
FIG. 5 illustrates a fourth embodiment of an exemplary safety cover, in accordance with the present disclosure.

Safety covers can cover or engage to both terminals of a nine volt battery to avoid creation of low resistance circuits. However, as both terminals on a battery need to be engaged in order to create a circuit including the battery, covering of one terminal of the battery would be effective to prevent creation of the low resistance circuit. FIG. 5 illustrates a fourth embodiment of an exemplary safety cover. Battery 10 is illustrated including terminal 12 and terminal 14. Safety cover 420 constructed of a plastic material is illustrated. Safety cover 420 includes upper tab 421 connecting to a terminal of battery 10 with feature 422, lower tab 423 connecting to a bottom surface of battery 10 with feature 424, and vertical member 425. Battery cover 420 is illustrated gripping to terminal 14, but terminal 12 can equally be utilized to avoid creation of a circuit with battery 10. Feature 424 can include an angled lead in 427 and a feature gripping to wrapped edge 19 of metallic jacket 16.

Figure 8:
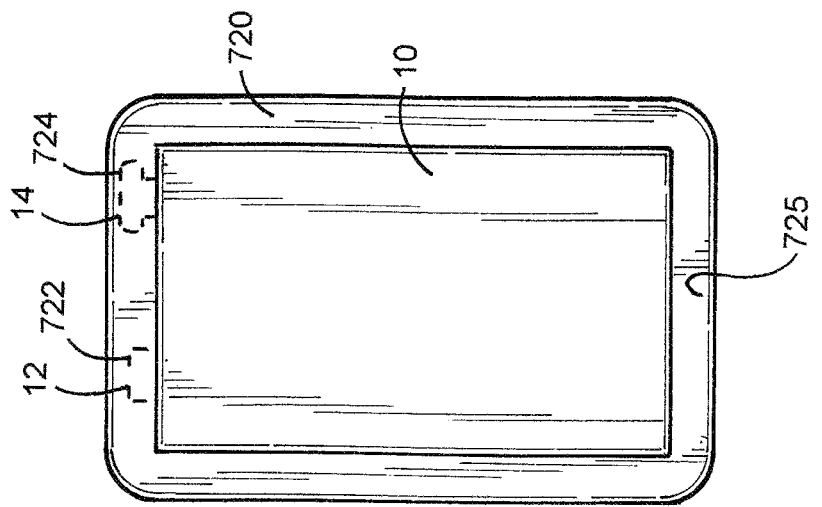
FIG. 8 illustrates an additional exemplary embodiment of a safety cover including an elastic band wrapped around the battery and covering at least one terminal of the battery, in accordance with the present disclosure.

FIGS. 4 and 5 illustrate a hard plastic safety cover that grips to a top surface and a bottom surface of the battery to cover at least one of the terminals of the battery. FIG. 8 illustrates an additional exemplary embodiment of a safety cover including an elastic band wrapped around the battery and covering at least one terminal of the battery. Battery 10 is illustrated including terminal 12 and terminal 14. Safety cover 720 constructed of an elastic material similar to a rubber band is illustrated. Safety cover 720 includes features 722 and 724 to engage to terminals 12 and 14, respectively. Safety cover 720 is configured to be located to the terminals and have distal end 725 be stretched around battery 10, such that the stretched safety cover 720 will remain engaged to the terminals.

In an alternative embodiment, safety cover 720 could be constructed of a recycled paper material, and a back portion of the safety cover 720 could be filled in to cup the battery 10 within a perimeter of safety cover 720, with the battery wedging within the cavity formed in the cover like an egg being secured to an egg carton.

Figure 6:
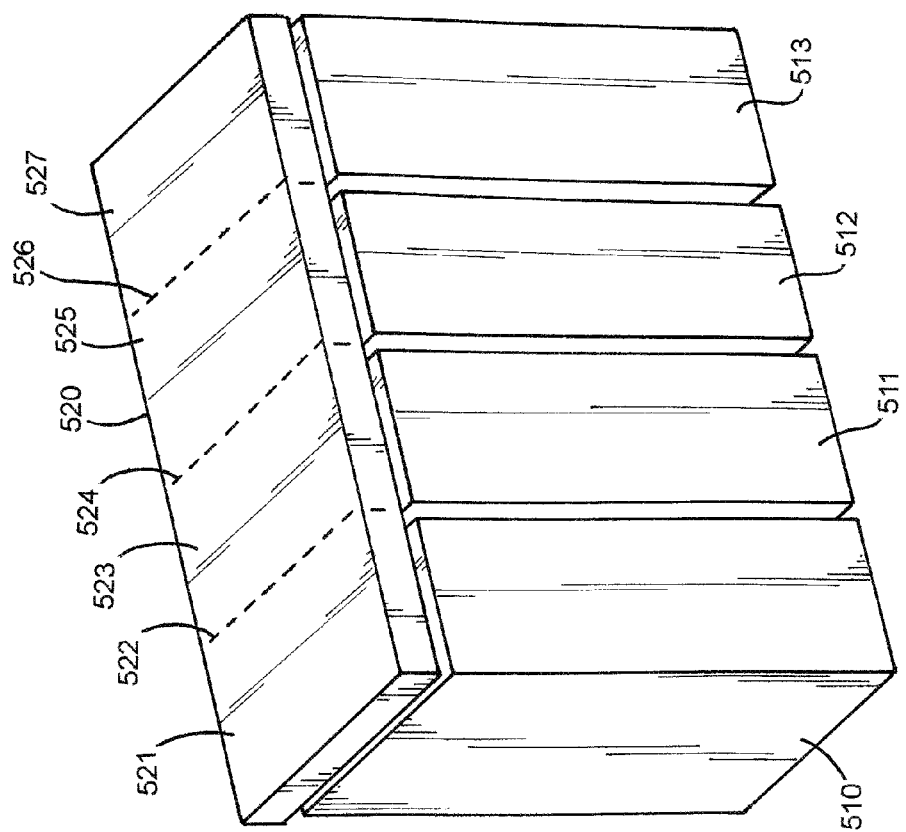
FIG. 6 illustrates an exemplary safety cover strip including a plurality of separable safety covers, in accordance with the present disclosure.

FIG. 6 illustrates an exemplary safety cover strip including a plurality of separable safety covers. Batteries 510, 511, 512, and 513 are illustrated secured to safety cover strip 520. Safety cover strip 520 includes a plurality of separable safety covers 521, 523, 525, and 527 separated by perforations 522, 524, and 526, respectively. Perforations can include thinned sections or otherwise weakened sections of safety cover strip 520, permitting a user to apply a bending force, twisting force, or pulling force to remove one of the safety covers from the safety cover strip. In one embodiment, safety cover strip 520 can be sold or provided by a recycling company, such that a user can have easy access to a supply of easily accessed individual safety covers as needed. In another embodiment, a set of fresh batteries can be sold with the safety cover strip 520 installed thereto, and as each battery is removed from the sales package, the attached safety cover can be snapped off and used to secure to the battery being replaced.

Figure 7:
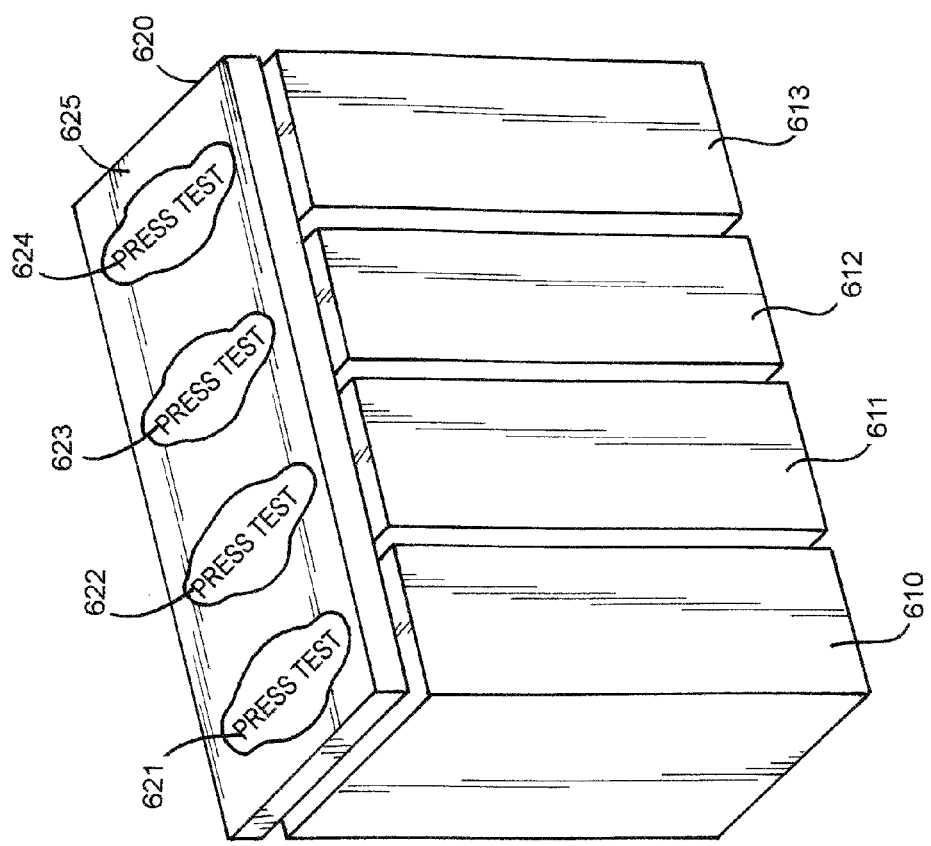
FIG. 7 illustrates an exemplary safety cover strip including test strips located to each battery connection, in accordance with the present disclosure.

FIG. 7 illustrates an exemplary safety cover strip including test strips located to each battery connection. Batteries 610, 611, 612, and 613 are illustrated attached to safety cover strip 620. Safety cover strip 620 is illustrated as a safety cover remaining intact and accepting more than one battery at a time. Safety cover strip 620 can include a top surface 625 configured to receive an indication by a user indicating whether the battery secured to a particular position is fresh or de-charged. In one exemplary embodiment, a position can be indicated for a user to make an "x" with a permanent marker if the battery installed thereto is de-charged. In another embodiment, a thinned section in safety cover strip 620 similar to a known detent feature in soft drink lids permitting a user to press the detent an permanently cause strain discoloration in a plastic material can be used to show that the battery installed to that position is de-charged. Safety cover strip 620 includes optional voltage test strips 621, 622, 623, and 624 which, when depressed, include an indication of a present charge of the attached battery. According to one known embodiment widely used by Duracell®, depression of a test button causes a coloration indicator to change colors based upon a voltage available in the battery being tested. As safety cover strip 620 is filled with de-charged batteries, the entire strip can be recycled as a unit.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A device for preventing creation of a low resistance circuit by a nine volt battery, the device comprising:
    a safety cover configured to securely adhere to at least one of two terminals of the battery, the safety cover comprising:
    a single piece polymer body; and
    at least one hole with a smaller diameter than a diameter of the terminal of the battery with which it is configured to mate.

2. The device of claim 1, wherein the safety cover securely adheres to the at least one of the two terminals of the battery by creating an interference fit with the at least one of the two terminals.

3. The device of claim 1, wherein the safety cover securely adheres to the at least one of the two terminals of the battery by gripping to an undercut feature of a negative terminal of the battery.

4. The device of claim 1, wherein the safety cover securely adheres to the at least one of the two terminals of the battery by elastically stretching across the two terminals.

5. The device of claim 1, further comprising a feature configured to attach to one of the terminals; and
    wherein the safety cover additionally adheres to the at least one of the two terminals of the battery by elastically stretching around the battery.

6. The device of claim 1, wherein the safety cover additionally adheres to the at least one of the two terminals of the battery by engaging to a top surface of the battery and to a bottom surface of the battery.

7. The device of claim 1, further comprising a plurality of separable safety covers connected together as a safety cover strip.

8. The device of claim 7, wherein the plurality of separable safety covers are joined together by perforated sections.

9. The device of claim 1, wherein the safety cover comprises a safety cover strip configured to engage a plurality of batteries.

10. The device of claim 9, wherein the safety cover strip is configured to receive an indication by a user whether a particular attached battery is fresh or de-charged.

11. The device of claim 9, wherein the safety cover strip comprises test strips configured to provide an indication of a voltage of an attached battery.

12. The device of claim 1, wherein the safety cover is constructed of a rubberized material.

13. A device for preventing creation of a low resistance circuit by a nine volt battery, the device comprising:
    a safety cover configured to securely adhere to terminals of the battery, the safety cover comprising:
    a single piece polymer body; and
    at least one hole with a smaller diameter than a diameter of the terminal of the battery with which it is configured to mate; and
    the battery;
    wherein the battery comprises a fresh battery; and
    wherein the safety cover is configured to release the fresh battery and subsequently receive a de-charged battery.

14. The device of claim 13, further comprising:
    a plurality of separable safety covers connected together as a safety cover strip; and
    a plurality of fresh batteries, each installed to one of the separable safety covers.

* * * * *